United States Patent

Berta

[11] Patent Number: 5,962,573
[45] Date of Patent: Oct. 5, 1999

[54] DIRECTLY PAINTABLE THERMOPLASTIC OLEFIN COMPOSITION CONTAINING OXIDIZED POLYETHYLENE WAXES

[75] Inventor: Dominic A. Berta, Newark, Del.

[73] Assignee: Montell North America Inc., Wilmington, Del.

[21] Appl. No.: 09/023,245

[22] Filed: Feb. 13, 1998

[51] Int. Cl.[6] .................................................. C08L 23/26
[52] U.S. Cl. ........................ 524/487; 524/488; 524/489; 525/193; 525/194; 525/195; 525/240
[58] Field of Search .................................. 524/487, 488, 524/489; 525/240, 193, 194, 198

[56] References Cited

U.S. PATENT DOCUMENTS

| | | | |
|---|---|---|---|
| 5,143,978 | 9/1992 | Berta | 525/240 |
| 5,302,454 | 4/1994 | Cecchin et al. | 428/402 |
| 5,360,868 | 11/1994 | Mosier et al. | 525/89 |
| 5,486,419 | 1/1996 | Clementini et al. | 428/397 |

FOREIGN PATENT DOCUMENTS

| | | |
|---|---|---|
| 634424 | 1/1995 | European Pat. Off. . |
| 662496 | 7/1995 | European Pat. Off. . |

*Primary Examiner*—Mark Warzel

[57] ABSTRACT

Directly paintable polymer compositions contain (1) a thermoplastic olefin, (2) a propylene homopolymer or propylene copolymer with ethylene or a 4–8 C alpha-olefin, grafted with an anhydride of an aliphatic α, β-unsaturated dicarboxylic acid, (3) an oxidized polyethylene wax having a melting point of less than 116° C. and an acid number of less than 40, (4) a functionalized polymer that reacts with the anhydride groups of the grafted polymers, and, optionally, (5) a polyolefin rubber grafted with an anhydride of an aliphatic α, β-unsaturated dicarboxylic acid, and (6) an ethylene polymer grafted with an anhydride of an aliphatic α, β-unsaturated dicarboxylic acid. The compositions are particularly useful for making injection molded parts such as automobile bumpers, and exhibit excellent paint adhesion and durability.

8 Claims, No Drawings

DIRECTLY PAINTABLE THERMOPLASTIC OLEFIN COMPOSITION CONTAINING OXIDIZED POLYETHYLENE WAXES

FIELD OF THE INVENTION

This invention relates to thermoplastic olefin compositions containing polymers grafted with an anhydride of an aliphatic α, β-unsaturated dicarboxylic acid, and functionalized polymeric additives.

BACKGROUND OF THE INVENTION

Thermplastic olefins (TPOs) are uncrosslinked blends of olefin polymers and polyolefin elastomers. They can be made by physically blending in an internal mixer, or by polymerizing in a reactor. These materials are not paintable or coatable, because the paints or coatings consist of polar materials like urethanes, acrylics, epoxies, or melamines that have very poor adhesion to nonpolar materials like polyolefins. Typically an adhesion promoter is used as the tie layer between the TPO substrate and the paint coating. This extra step adds to the cost of the product, and the coating is not very durable.

European Patent Application 662,496 discloses a paintable or printable polymer composition consisting of a polyolefin or polyolefin/rubber blend and 0.1 to 10% by weight of at least one polymeric additive that is the reaction product of (a) a polyolefin or polyester modified by an unsaturated acid, ester or anhydride, and (b) an amine-, hydroxy-, or alkoxy-terminated polyoxyethylene, polyoxypropylene, or a copolymer of the two, e.g., the reaction product of a maleic anhydride-modified polypropylene wax and a methoxy-capped poly(ethylene oxide) glycol.

European Patent Application 634,424 discloses a blend of polypropylene with the reaction product of maleated polypropylene and a polyether amine. The blend displays improved paintability, improved impact resistance, and excellent mold flowability compared to blends of polypropylene and the reaction product of polypropylene and maleated polypropylene. However, the compositions disclosed in EP 662,496 and EP 634,424 are both lacking in durability.

Thus, there is still a need for a TPO composition that can meet the more stringent requirements for paint adhesion and durability that are required in today's marketplace, particularly in the automotive industry.

SUMMARY OF THE INVENTION

The composition of this invention comprises, by weight:

(1) 100 parts of a thermoplastic olefin comprising an olefin polymer having an isotactic index of at least 80 and an olefin polymer rubber, the thermoplastic olefin having a rubber content of at least 20%;

(2) about 5 to about 20 parts per hundred parts of the thermoplastic olefin of a propylene homopolymer or propylene copolymer with ethylene or a 4–8 C alpha-olefin having an ethylene or alpha-olefin content of about 0.5% to about 20%, grafted with an anhydride of an aliphatic α, β-unsaturated dicarboxylic acid and having an anhydride content of about 2% to about 5%;

(3) about 3 to about 20 parts per hundred parts of the thermoplastic olefin of an oxidized polyethylene wax having a melting point of less than 116° C. and an acid number of less than 40;

(4) a functionalized polymer that is reactive with the anhydride groups of the grafted polymers, selected from the group consisting of:

(a) about 2 to about 6 parts per hundred parts of the thermoplastic olefin of an amine-terminated polyalkylene glycol;

(b) about 2 to about 6 parts per hundred parts of the thermoplastic olefin of a hydroxy-terminated polyolefin;

(c) about 2 to about 6 parts per hundred parts of the thermoplastic olefin of a hydroxy-terminated polybutadiene;

(d) about 2 to about 8 parts per hundred parts of the thermoplastic olefin of a hydroxy-terminated olefin/alkylene oxide copolymer;

(e) about 2 to about 8 parts per hundred parts of the thermoplastic olefin of a hydroxy-terminated polyalkylene oxide;

(f) about 2 to about 8 parts per hundred parts of the thermoplastic olefin of a methoxy-termninated polyalkylene oxide;

(g) about 2 to about 8 parts per hundred parts of the thermoplastic olefin of an amine-terminated olefin/alkylene oxide copolymer, and (h) mixtures thereof;

(5) optionally, about 5 to about 30 parts per hundred parts of the thermoplastic olefin of a polyolefin rubber grafted with an anhydride of an aliphatic α, β-unsaturated dicarboxylic acid, having an anhydride content of at least 0.3% but less than 3% and comprising a polymer of ethylene and a 3–8 C alpha-olefin, optionally containing about 0.5% to about 10% of a diene, having an ethylene content of about 30% to about 70%; and (6) optionally, about 5 to about 20 parts per hundred parts of the thermoplastic olefin of an ethylene polymer grafted with an anhydride of an aliphatic α, β-unsaturated dicarboxylic acid, having an anhydride content of about 1% to about 16% and a molecular weight $M_n$ of about 500 to about 5000, provided that at least 5 parts of anhydride-grafted polypropylene or propylene copolymer and 3 parts of oxidized polyethylene wax per hundred parts of the thermoplastic elastomer are also present.

Injection molded parts such as automobile bumpers made from this composition are directly paintable with polar paints or coatings without the need for a layer of adhesion promoter between the thermoplastic olefin surface and the paint, and exhibit excellent paint adhesion and durability.

DETAILED DESCRIPTION OF THE INVENTION

Component (1) of the composition of this invention is a thermoplastic olefin comprising a crystalline olefin polymer and an olefin polymer rubber, the thermoplastic olefin having a rubber content of at least 20%. Suitable thermoplastic olefins include, for example, (a) a composition comprising, by weight, (i) about 10% to about 60%, preferably about 20% to about 50%, of a propylene homopolymer having an isotactic index greater than 90, preferably between 95 and 98, or a crystalline propylene copolymer with ethylene and/or a $C_{4-8}$ alpha-olefin having a propylene content greater than 85% and an isotactic index of greater than 85;

(ii) about 30% to about 60%, preferably about 30% to about 50%, of an amorphous ethylene-propylene or ethylene-butene copolymer, optionally containing about 1% to about 10% of a diene, which is xylene soluble at room temperature and has an ethylene content of about 30% to about 70%;

(iii) about 2% to about 20%, preferably about 7% to about 15%, of a semi-crystalline ethylene-propylene or ethylene-butene copolymer that is xylene insoluble at room temperature and has an ethylene content of greater than 75% but less than 92%; and (iv) about 5% to about 20%, preferably about 7% to about 15%, of an ethylene polymer having a density of 0.91 to 0.96 g/cm$^3$ and a melt index of 0.1 to 100 g/10 min, preferably about 15 to about 50 g/10 min. Ethylene homopolymer is preferred. However, copolymers containing 8% or less of an alpha-olefin comonomer can also be used.

(b) a composition comprising, by weight:

(i) about 20% to about 70%, preferably about 50% to about 70%, of a crystalline propylene homopolymer having an isotactic index greater than 90, preferably between 95 and 98, or a crystalline propylene copolymer with ethylene and/or a $C_{4-8}$ alpha-olefin having a propylene content greater than 85% and an isotactic index of greater than 85;

(ii) about 20% to about 75%, preferably about 30% to about 50%, most preferably about 30% to about 35%, of an amorphous copolymer of ethylene selected from the group consisting of (1) ethylene/propylene, (2) ethylene/butene-1, (3) ethylene/octene-1, and (4) mixtures thereof, optionally containing about 1% to about 10%, preferably about 1% to about 4%, of a diene, which is xylene soluble at room temperature and has an ethylene content of about 30% to about 70%, preferably about 40% to about 60%; and (iii) about 2% to about 30%, preferably about 2% to about 10%, most preferably about 2% to about 5%, of a semi-crystalline copolymer of ethylene selected from the group consisting of (1) ethylene/propylene, (2) ethylene/butene-1, (3) ethylene/octene-1, and (4) mixtures thereof, which is xylene insoluble at room temperature and has an ethylene content of greater than 90%;

(c) a composition comprising, by weight, (i) at least one heterophasic polyolefin composition comprising:

(1) about 90% to about 55% of a propylene polymer material selected from the group consisting of a propylene homopolymer having an isotactic index greater than 90, and a crystalline copolymer of propylene and an alpha-olefin of the formula $CH_2=CHR$, where R is H or $C_2-C_6$ alkyl, the alpha-olefin being less than 10% of the copolymer, and (2) about 10% to about 45% of an elastomeric copolymer of propylene and an alpha-olefin of the formula $CH_2=CHR$, where R is H or $C_2-C_6$ alkyl, the alpha-olefin being about 50% to about 70% of the elastomeric copolymer, and about 10% to about 40% of the elastomeric copolymer being insoluble in xylene at ambient temperature, and (ii) about 5 to about 50 parts, preferably about 10 to about 30 parts, and most preferably about 10 to about 25 parts, per hundred parts of (c)(i) of an elastomeric copolymer of ethylene and a 3–8 C alpha-olefin made with a metallocene catalyst. If more than one heterophasic polyolefin (c)(i) is present, the heterophasic polyolefins can be combined in any proportion.

(d) a composition comprising, by weight:

(i) about 30% to about 50%, preferably about 35% to about 45%, of a propylene homopolymer having an isotactic index greater than 90, and (ii) about 70% to about 50%, preferably about 65% to about 55%, of an olefin polymer composition comprising:

(1) about 25% to about 50% of a crystalline propylene homopolymer with a solubility in xylene at room temperature of less than or equal to 4%, or a crystalline copolymer of propylene with ethylene or a 4–8 C alpha-olefin having an ethylene or alpha-olefin content of about 0.5% to about 3%, and a solubility in xylene at room temperature of less than or equal to 4%, and (2) about 50% to about 75% of an amorphous copolymer of ethylene and a 4–8 C alpha-olefin, wherein the alpha-olefin content is about 10% to about 20%, and the copolymer is about 10% to about 40% soluble in xylene at room temperature; and (e) a composition comprising, by weight:

(i) about 80% to about 30%, preferably about 70% to about 50%, of a propylene homopolymer having an isotactic index greater than 90, and (ii) about 20% to about 70%, preferably about 30% to about 50%, of an elastomeric copolymer of ethylene and a 3–8 C alpha-olefin, optionally containing about 1% to about 10%, preferably about 1% to about 4%, of a diene, and having an ethylene content of about 30% to about 70%, preferably about 40% to about 60%.

Thermoplastic olefins (a) and (c) are preferred.

Thermoplastic olefins (a) and (b) and compositions (c)(i) and (d)(ii) are typically prepared by sequential polymerization in at least two stages. Alternatively, the components can be prepared separately and then blended together by melt-kneading or melt blending. The polymerization conditions and the polymerization catalyst are described in more detail in U.S. Pat. Nos. 5,143,978; 5,302,454; 5,360,868, and 5,486,419, which are incorporated herein by reference. Sequential polymerization is preferred.

For TPO (a), (i) can be made in the first reactor, (ii) and (iii) in the second reactor, and (iv) in the third reactor. Alternatively, (iv) can be made in the second reactor and (ii) and (iii) in the third reactor.

For TPO (b), (i), (ii), and (iii) are preferably formed in a reactor or series of reactors in at least two stages by first polymerizing propylene to form (i) and then polymerizing ethylene and propylene, butene-1, or octene-1, or mixtures thereof, in the presence of (i) and the catalyst used in the first stage to form (ii) and (iii). The polymerization can be conducted in the liquid or gas phase or in liquid-gas phase.

For TPO (b), (i) can be prepared using a Ziegler-Natta catalyst or a mixture of Ziegler-Natta and metallocene catalysts. Components (ii) and (iii) can be prepared using Ziegler-Natta or metallocene catalysts or a combination of the two, with one type of catalyst being used for one stage and the other type of catalyst being used for the next stage when the TPO is made by sequential polymerization.

The $C_{4-8}$ alpha-olefins useful in the preparation of the thermoplastic olefins include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Component (2) is a propylene homopolymer or propylene copolymer with ethylene or a 4–8 C alpha-olefin, grafted with an anhydride of an aliphatic α, β-unsaturated dicarboxylic acid and having an ethylene or alpha-olefin content of about 0.5% to about 20%, preferably about 1% to about 10%, and most preferably about 1% to about 5%. The polymer has an anhydride content of about 2% to about 5%, preferably about 3% to about 4%, and preferably has a molecular weight $M_n$ of about 2500 to about 25,000, more preferably about 3000 to about 10,000. Maleic anhydride is the preferred anhydride. Component (2) is present in an amount of about 5 to about 20 parts, preferably about 8 to about 16 parts, most preferably about 10 to about 14 parts, per hundred parts of the thermoplastic olefin.

Component (3) is an oxidized polyethylene wax having a melting point of less than 116° C. and an acid number of less than 40. The oxidized wax is present in an amount of about 3 to about 20 parts, preferably about 5 to about 15 parts, most preferably about 5 to about 10 parts, per hundred parts of the thermoplastic polyolefin, whether or not the maleic anhydride-grafted rubber is present.

Component (4) is a functionalized polymer that is reactive with the anhydride groups of the grafted polymers (2) and, when present, (5) and (6), selected from the group consisting of (a) an amine-terminated polyalkylene glycol, (b) a hydroxy-terminated polyolefin, (c) a hydroxy-terminated polybutadiene, (d) hydroxy-terminated olefin/alkylene oxide copolymers, (e) hydroxy-terminated polyalkylene oxides, (f) methoxy-terminated polyalkylene oxides, (g) amine-terminated olefin/alkylene oxide copolymers, and (h) mixtures thereof.

Component (4)(a), when present, is used in an amount of about 2 to about 6 parts, preferably about 2 to about 4 parts, per hundred parts of the thermoplastic olefin. The polyalkylene glycol can be, for example, polyethylene glycol, polypropylene glycol, copolymers of ethylene glycol and propylene glycol, poly(1,2-butylene glycol), and poly(tetramethylene glycol).

Component (4)(b), when present, is used in an amount of about 2 to about 6 parts, preferably about 2 to about 4 parts, per hundred parts of the thermoplastic olefin. Polyethylene is the preferred polyolefin, although polypropylene, polybutene, and copolymers of ethylene and another alpha-olefin can also be used.

Component (4)(c), when present, is used in an amount of about 2 to about 6 parts, preferably about 2 to about 4 parts, per hundred parts of the thermoplastic olefin.

Component (4)(d), when present, is used in an amount of about 2 to about 8 parts, preferably about 2 to about 6 parts, per hundred parts of the thermoplastic olefin. An ethylene/ethylene oxide copolymer is preferred, although other copolymers such as ethylene/propylene oxide, propylene/ethylene oxide, butene/ethylene oxide, and butene/propylene oxide copolymers can also be used. The amount of alkylene oxide can be from about 10% to about 99.9%, preferably about 50% to about 98%, and most preferably about 75% to about 95%, based on 100% of the copolymer.

Component (4)(e), when present, is used in an amount of about 2 to about 8 parts, preferably about 2 to about 6 parts, per hundred parts of the thermoplastic olefin. Polyethylene glycol is preferred, however, polypropylene glycol, copolymers of ethylene glycol and propylene glycol, poly(1,2-butylene glycol), and poly(tetramethylene glycol) can also be used.

Component (4)(f), when present, is used in an amount of about 2 to about 8 parts, preferably about 2 to about 6 parts, per hundred parts of the thermoplastic olefin. Suitable polyalkylene oxides are those described under (4)(e).

Component (4)(g), when present, is used in an amount of about 2 parts to about 8 parts, preferably about 2 to about 6 parts, per hundred parts of the thermoplastic olefin. The amount of alkylene oxide can be about 10% to about 99.9%, preferably about 50% to about 98%, and most preferably about 75% to about 95%. Examples of suitable olefin/alkylene oxide copolymers are described under (4)(d).

When using a combination of functionalized polymers, the amount of each component can vary widely from about 0.1% to about 99.9% of each, based on the total amount of funtionalized polymers. It is preferred that one component be present in an amount of >50%, preferably >60%, based on the total amount of functionalized polymers.

Instead of adding the functionalized polymer directly to the thermoplastic olefin, an adduct of the functionalized polymer and the anhydride-grafted polypropylene or ethylene/propylene copolymer can be prepared separately, then blended with the thermoplastic olefin.

Optional component (5) is a polyolefin rubber grafted with an anhydride of an aliphatic α, β-unsaturated dicarboxylic acid and comprising a polymer of ethylene and a 3–8 C alpha-olefin, optionally containing about 0.5% to about 10% of a diene, preferably about 2% to about 6%. The anhydride-grafted polyolefin rubber has an ethylene content of about 30% to about 70%, preferably about 40% to about 60%, and has an anhydride content of at least 0.3% but less than 3%. Maleic anhydride is the preferred anhydride. When present, the anhydride-grafted rubber is used in an amount of about 5 to about 30 parts, preferably about 5 to about 15 parts, most preferably about 5 to about 12 parts, per hundred parts of the thermoplastic olefin.

Optional component (6) is an ethylene polymer grafted with an anhydride of an aliphatic α, β-unsaturated dicarboxylic acid and having an anhydride content of about 1% to about 16% by weight, preferably about 2% to about 13%, most preferably about 3% to about 13%. Maleic anhydride is the preferred anhydride. Ethylene homopolymer is preferred. However, copolymers containing 10% or less of an alpha-olefin comonomer can also be used. The ethylene polymer preferably has a molecular weight $M_n$ of about 500 to about 5000, preferably about 600 to about 2000, most preferably about 600 to about 1000. When component (6) is used, it is present in an amount of about 5 to about 20 parts, preferably about 5 to about 10 parts, per hundred parts of the thermoplastic olefin, provided that at least 5 parts of anhydride-grafted polypropylene or propylene copolymer and 3 parts of oxidized polyethylene wax per hundred parts of the thermoplastic olefin are also present.

The composition of the present invention can also contain other conventional additives, for example, antioxidants; stabilizers; extender oils such as paraffinic and naphthenic oils; fillers such as $CaCO_3$, talc, carbon black, and zinc oxide, or flame retardants.

If non-polymeric additives such as conductive or non-conductive carbon black are used, they are preferably added after the functionalized polymer has reacted with the anhydride-grafted polymers. The additives can also be added as a dispersion in a polymer, preferably an olefin polymer.

The compounding or melt blending of the components of the composition can be carried out on an open roll, in an internal mixer (Banbury or Haake mixers), or in single-screw or twin screw extruders.

The compositions of this invention can be formed in any way, such as, for example, by extrusion, compression molding, and thermoforming. Injection molding is preferred. They can also be co-extruded or co-injection molded with other polyolefin materials such as propylene homopolymers, copolymers, and graft copolymers; ethylene homopolymers and copolymers, or thermoplastic olefins such as those described previously. They can also be co-extruded or co-injection molded with olefin-based dynamically vulcanized elastomers or olefin-compatible thermoplastic elastomers such as styrene/butadiene copolymers.

In order to create a more severe test for paint adhesion, the specimens for testing were prepared using a pin-gated mold rather than the fan-gated mold typically used for molding thermoplastic olefins. Durability depends upon the paint thickness—the thicker the paint or film, the better the durability. In the following examples and comparative examples only one coat of paint was used with an approximately 1.2 mil film thickness, which is a very severe test. A typical durability test used in the automotive industry also employs a top coat that has a low coefficient of friction, which reduces the severity of the test. No top coat was used in the following examples and comparative examples.

The samples for testing were prepared by dry blending the ingredients and reactive mixing in a twin screw extruder at a temperature of 450° F. and pelletizing the resultant material. The pellets were injection molded into disks that were painted with about a 1.2 to 2 mil thick coating using DuPont 872 white paint and cured at 250° F. for thirty minutes. A lattice pattern of squares with each square about ¼ inch in size was scribed on the painted disk at the end opposite the gate area of the disk. Adhesive tape (3M 898) was pressed onto the paint and pulled off to test the amount of paint removed or the paint adhesion. The % failure was recorded as the % of the squares removed by the tape after one pull. The durability was determined by using a Taber abrader with a type C scuffing head assembly and a one pound load. The painted disk was placed in an oven at 70° C. for one hour, removed and placed on the platform of the abrader. The scuffing head was placed in contact with the painted surface and the disk was rotated for a specified number of cycles. The amount of paint removed from the complete circumference subtended by the scuffing head was recorded as the % failure.

The criteria set for acceptable paint adhesion were <50% failure in the gate area of the disk and <10% in the area opposite the gate area after the first pull, and <85% failure in the gate area and <50% in the area opposite the gate after the fifth pull. The criteria for satisfactory durability was <50% failure after 100 cycles.

In this specification all parts and percentages are by weight unless otherwise noted.

EXAMPLES 1–4 AND COMPARATIVE EXAMPLES 1–3

Examples 1–4 show the paint adhesion and durability of compositions containing a thermoplastic olefin (TPO), a maleic anhydride-grafted polypropylene (MA-g-PP), an oxidized polyethylene wax, and an amine-terminated polyethylene oxide (ATPEO), with and without a maleic anhydride-grafted polyolefin rubber (MA-g-rubber). The effect of the melting point of the oxidized polyethylene wax was also demonstrated. The results are shown in Table 1.

In Table 1, TPO 1 contained 55% propylene homopolymer, 3% semi-crystalline ethylene/propylene copolymer that had a propylene content of ~10% and was insoluble in xylene at room temperature, 30% amorphous ethylene/propylene copolymer rubber that had an ethylene content of 50% and was soluble in xylene at room temperature, and 12% ethylene homopolymer having a melt index of about 50 g/10 min.

MA-g-rubber 1 was Exxelor VA-1803 ethylene/propylene rubber containing 0.7% grafted maleic anhydride, commercially available from Exxon Chemical Company. MA-g-rubber 2 was Royaltuf 465A ethylene/propylene/non-conjugated diene terpolymer rubber containing 0.4% grafted maleic anhydride, having a Mooney viscosity (ML1+4@125° C.) of 60 and an ethylene/propylene ratio of 75/25, commercially available from Uniroyal Chemical Company, Inc.

MA-g-PP was Epolene E-43 maleic anhydride-modified polypropylene wax, commercially available from Eastman Chemical Company.

The ATPEO was XTJ-418 monoamine-terminated polyethylene oxide, commercially available from Huntsman Corporation.

The antioxidant was Irganox B 225, a blend of 1 part Irganox 1010 tetrakis[methylene(3,5-di-tert-butyl-4-hydroxyhydrocinnamate)methane and 1 part Irgafos 168 tris(2,4-di-tert-butylphenyl) phosphite antioxidant, commercially available from CIBA Specialty Chemicals Company.

Petrolite C-3500 oxidized polyethylene wax, Petrolite C-9500 oxidized polyethylene wax, and Petrolite E-2020 oxidized polyethylene wax are commercially available from Petrolite Corporation. The melting points and other properties of the waxes are given in Table 2. In Table 2, the numbers in parentheses are estimated values.

TABLE 1

|  | Ex. 1 | Ex. 2 | Ex. 3 | Comp. 1 | Comp. 2 | Comp. 3 |
| --- | --- | --- | --- | --- | --- | --- |
| TPO 1 | 100 | 100 | 100 | 100 | 100 | 100 |
| MA-g-rubber 1 | 5 | 5 | — | 5 | — | 5 |
| MA-g-rubber 2 | 5 | 5 | — | 5 | — | 5 |
| MA-g-PP | 10 | 10 | 10 | 10 | 10 | 10 |
| Petr. C-3500 | 5 | — | 10 | — | — | — |
| Petr. C-9500 | — | 5 | — | — | — | — |
| Pett. E-2020 | — | — | — | — | 10 | 5 |
| ATPEO | 3 | 3 | 3 | 3 | 3 | 3 |
| Antioxidant | 0.2 | 0.2 | 0.2 | 0.2 | 0.2 | 0.2 |
| Paint Adhesion |  |  |  |  |  |  |
| % Failure | g/op | g/op | g/op | g/op | g/op | g/op |
| 1$^{st}$ pull | 12/0 | 42/3 | 12/6 | 64/0 | 64/18 | 48/18 |
| 3$^{rd}$ pull | 30/8 | 48/9 | 36/12 | 80/40 | 76/42 | 56/48 |
| 5$^{th}$ pull | 46/36 | 70/25 | 50/36 | 94/65 | 94/66 | 84/68 |
| Durability |  |  |  |  |  |  |
| % Failure |  |  |  |  |  |  |
| 25 cycles | 0 | 0 | 0 | 25 | 14 | 40 |
| 100 cycles | 6 | 22 | 20 | 60 | 50 | 80 |

TABLE 2

|  | Acid No. | Mn | Viscosity cp @ 149° C. | Density g/cm$^3$ | Melt Index g/10 min | Melt Pt. ° C. |
| --- | --- | --- | --- | --- | --- | --- |
| AC 307 | 5–9 | 50,000 | 85,000 | 0.98 | >1,000 | 140 |
| AC 325 | 25 | 6,000 | 4,400 | 0.99 | >2,000 | 136 |
| Petr. C-8500 | 9 | (8,000) | (6,000) | — | >2,000 | 95 |
| Petr. C-7500 | 15 | (6,000) | (4,000) | — | >3,000 | 97 |
| Petr. C-3500 | 24 | 1,500 | 30 | — | >5,000 | 96 |
| Petr. C-9500 | 31 | (1,000) | (20) | — | >5,000 | 94 |
| Petr. E-2020 | 22 | 2,500 | 75 | — | >5,000 | 116 |
| Petr. E-1040 | 40 | (1,500) | 25 | — | >5,000 | 106 |

Examples 1 and 2 show the improvement in paint adhesion and durability when an oxidized polyethylene wax is used along with the TPO, MA-g-PP, MA-g-rubber, and the ATPEO. Comparative Example 1 does not contain an oxidized polyethylene wax. Examples 3 and 4 show that the oxidized waxes produce good paint adhesion and durability without the MA-g-rubber. Comparative Examples 2 and 3 show that not all oxidized polyethylene waxes are effective in the compositions of this invention.

EXAMPLES 5–7 AND COMPARATIVE EXAMPLES 4–6

These examples and comparative examples show the effect of using oxidized polyethylene waxes with varying melting points on paint adhesion and durability. All formulations contain MA-g-rubbers, MA-g-PP, and an ATPEO in addition to the TPO.

TPO 1, the MA-g-rubbers, the MA-g-PP, the antioxidant, and the ATPEO were the same as in Examples 1–4.

The results are shown in Table 3. The melting points and other properties of the waxes are given in Table 2.

TABLE 3

|  | Comp. 4 | Comp. 5 | Comp. 6 | Ex. 5 | Ex. 6 | Ex. 7 |
|---|---|---|---|---|---|---|
| TPO 1 | 100. | 100 | 100 | 100 | 100 | 100 |
| MA-g-rubber 1 | 5 | 5 | 5 | 5 | 5 | 5 |
| MA-g-rubber 2 | 5 | 5 | 5 | 5 | 5 | 5 |
| MA-g-PP | 10 | 10 | 10 | 10 | 10 | 10 |
| Petr. E-1040 | — | — | 5 | — | — | — |
| Petr. C-3500 | — | — | — | 10 | — | — |
| Petr. C-7500 | — | — | — | — | 5 | — |
| Petr. C-8500 | — | — | — | — | — | 5 |
| AC 307 | 5 | — | — | — | — | — |
| AC 325 | — | 5 | — | — | — | — |
| ATPEO | 3 | 3 | 3 | 3 | 3 | 3 |
| Antioxidant | 0.2 | 0.2 | 0.2 | 0.2 | 0.2 | 0.2 |
| Paint Adhesion |  |  |  |  |  |  |
| % Failure | g/op | g/op | g/op | g/op | g/op | g/op |
| 1st pull | 80/80 | 90/99 | 18/12 | 6/0 | 0/0 | 36/0 |
| 3rd pull |  |  | 84/36 | 30/0 | 78/0 | 28/12 |
| 5th pull |  |  | 84/78 | 70/11 | 78/12 | 60/42 |
| Durability |  |  |  |  |  |  |
| % Failure |  |  |  |  |  |  |
| 25 cycles | 90 | 95 | 0 | 0 | 0 | 0 |
| 100 cycles | 98 | 98 | 0 | 0 | 0 | 40 |

Table 3 shows that waxes with melting points of 116° C. or higher or an acid number of 40 or higher do not give adequate paint adhesion or durability (Comparative Examples 4–6).

EXAMPLES 8–9 AND COMPARATIVE EXAMPLES 7–9

These examples and comparative examples show the effect of using oxidized polyethylene waxes with varying melting points on compositions containing MA-g-PP and an ATPEO in addition to the TPO, but no MA-g-rubber.

The TPO, MA-g-PP, ATPEO, and the antioxidant were the same as in Examples 1–4. The results are shown in Table 4. The melting points and other properties of the oxidized polyethylene waxes are shown in Table 2.

TABLE 4

|  | Comp. 7 | Comp. 8 | Comp. 9 | Ex. 8 | Ex. 9 |
|---|---|---|---|---|---|
| TPO 1 | 100 | 100 | 100 | 100 | 100 |
| MA-g-PP | 10 | 10 | 10 | 10 | 10 |
| Petr. E-1040 | — | — | 10 | — | — |
| Petr. C-7500 | — | — | — | 10 | — |
| Petr. C-8500 | — | — | — | — | 10 |
| AC 307 | 10 | — | — | — | — |
| AC 325 | — | 10 | — | — | — |
| ATPEO | 3 | 3 | 3 | 3 | 3 |
| Antioxidant | 0.2 | 0.2 | 0.2 | 0.2 | 0.2 |
| Paint Adhesion |  |  |  |  |  |
| % Failure | g/op | g/op | g/op | g/op | g/op |
| 1st pull | 60/100 | 86/90 | 54/0 | 6/0 | 0/0 |
| 3rd pull |  |  | 70/26 | 48/0 | 36/0 |
| 5th pull |  |  | 70/54 | 72/0 | 60/12 |
| Durability |  |  |  |  |  |
| % Failure |  |  |  |  |  |
| 25 cycles | 0 | 15 | 0 | 0 | 0 |
| 100 cycles | 0 | 60 | 0 | 0 | 0 |

Table 4 shows that good adhesion and durability can be achieved if an oxidized polyethylene wax having a melting point below 116° C. as well as an acid number less than 40 is used (Examples 8 and 9).

EXAMPLES 10–12 AND COMPARATIVE EXAMPLES 10–11

These examples and comparative examples show the effect of using an oxidized polyethylene wax in a thermoplastic olefin composition containing two different heterophasic polyolefins, a metallocene rubber, MA-g-PP, and a functionalized polymer that reacts with the MA-grafted polymers, with and without a MA-g-rubber. The compositions also contain talc and conductive carbon black as fillers. The results are shown in Table 5.

In Table 5, heterophasic polyolefin 1 contained 85–86% polypropylene and 14–15% of an amorphous ethylene/propylene copolymer, of which 57% was ethylene and 43% was propylene and is commercially available from Montell USA Inc. Heterophasic polyolefin 2 contained 86.4% polypropylene, 9.45% of an amorphous ethylene/propylene copolymer that was soluble in xylene at room temperature, and 4.15% of a semi-crystalline ethylene/propylene copolymer that was insoluble in xylene at room temperature and is commercially available from Montell USA Inc. The MA-g-PP and the MA-g-rubbers were described in Examples 1–4.

Engage 8150 ethylene/octene copolymer rubber contains 25% octene and is commercially available from DuPont-Dow Elastomers. HPVM 2203 hydroxy-terminated polybutene is commercially available from Shell Chemical Company.

The carbon black concentrate was Colonial 3300 carbon black, a concentrate of 50% N-100 black in low density polyethylene, commercially available from Colonial Rubber Company The talc was Polar 9603 talc, commercially available from Polar Minerals. The antioxidant and the ATPEO were the same as in Examples 1–4.

TABLE 5

|  | Comp. 10 | Comp. 11 | Ex. 10 | Ex. 11 | Ex. 12 |
|---|---|---|---|---|---|
| Het. polyolefin 1 | 50 | 50 | 50 | 50 | 50 |
| Het. polyolein 2 | 30 | 30 | 30 | 30 | 30 |
| Engage 8150 | 20 | 20 | 20 | 20 | 20 |
| MA-g-PP | 10 | 10 | 10 | 10 | 10 |
| MA-g-rubber 1 | 5 | 5 | 5 | — | — |
| MA-g-rubber 2 | 5 | 5 | 5 | — | — |
| Petr. C-3500 | — | — | 5 | — | — |
| Petr. C-9500 | — | — | — | 5 | 10 |
| Hydrox. polybutene | — | — | — | 2 | 2 |
| ATPEO | 3 | 4 | 3 | 3 | 3 |
| Talc | 2 | 2 | 2 | 2 | 2 |
| Carbon black conc. | 4 | 4 | 4 | 4 | 4 |
| Antioxidant | 0.2 | 0.2 | 0.2 | 0.2 | 0.2 |
| Paint Adhesion |  |  |  |  |  |
| % Failure | g/op | g/op | g/op | g/op | g/op |
| 1st pull | 100/100 | 100/100 | 46/8 | 40/0 | 32/0 |

TABLE 5-continued

|  | Comp. 10 | Comp. 11 | Ex. 10 | Ex. 11 | Ex. 12 |
|---|---|---|---|---|---|
| 3rd pull |  |  | 60/20 | 66/20 | 42/16 |
| 5th pull |  |  | 80/30 | 80/48 | 62/42 |
| Durability |  |  |  |  |  |
| % Failure |  |  |  |  |  |
| 25 cycles | 100 | 100 | 0 | 0 | 0 |
| 100 cycles | 100 | 100 | 0 | 18 | 12 |

Comparative Examples 10 and 11 without the waxes showed very poor paint adhesion and durability. Using the waxes with the MA-g-PP, with or without the MA-g-rubber, gave good adhesion and durability. Examples 11 and 12 show that a combination of an ATPEO and hydroxylated polybutene can be used as the functionalized polymer component of the composition.

EXAMPLES 13–17 AND COMPARATIVE EXAMPLES 12–14

These examples and comparative examples show the effect of using an oxidized polyethylene wax in compositions containing two different thermoplastic olefins, MA-g-PP or MA-g-E/P, and a functionalized polymer that reacts with the MA-grafted polymers, with and without a MA-g-rubber. The results are shown in Table 6.

In Table 6, TPO 2 contained 68% of a ethylene/propylene copolymer having an ethylene content of 2.6%, 2% of a semi-crystalline ethylene/propylene copolymer that was insoluble in xylene at room temperature, and 30% of an amorphous ethylene/propylene copolymer that was soluble in xylene at room temperature.

TPO 1, the MA-g-PP, and MA-g-rubber 1 were described in Examples 1–4.

MA-g-E/P was ACX 597 maleic anhydride-grafted ethylene/propylene copolymer, commercially available from Allied Signal Inc. In Examples 16 and 17 and Comparative Examples 13 and 14, the MA-g-E/P was added in the form of a 10/3 or 10/4 adduct with the ATPEO, respectively. The ATPEO and the antioxidant were the same as in Examples 1–4.

Comparative Examples 12–14 without the waxes showed very poor paint adhesion and durability. Using the waxes with the MA-g-PP or MA-g-E/P, with or without the MA-g-rubber, gave good adhesion and durability.

EXAMPLES 18–22 AND COMPARATIVE EXAMPLE 15

These examples and the comparative example show the effect of using an oxidized polyethylene wax in a thermoplastic olefin composition containing MA-g-PP, a functionalized polymer that reacts with MA-grafted polymers, and talc as a filler, with and without a MA-g-rubber. The results are shown in Table 7.

In Table 7, the hydroxy-terminated polybutadiene was PolyBD R-45HT hydroxy-terminated polybutadiene, commercially available from Elf Atochem. TPO 1, the MA-g-rubber, and the MA-g-PP were described in Examples 1–4. The talc was Jetfill 700C talc, commercially available from Luzenac America. The hydroxy-terminated polybutene and the talc were described in Examples 10–12. The antioxidant and the ATPEO were the same as in the previous examples.

TABLE 7

|  | Comp. 15 | Ex. 18 | Ex. 19 | Ex. 20 | Ex. 21 | Ex. 22 |
|---|---|---|---|---|---|---|
| TPO 1 | 100 | 100 | 100 | 100 | 100 | 100 |
| MA-g-rubber 1 | 5 | 5 | 5 | 5 | — | — |
| MA-g-PP | 10 | 10 | 10 | 10 | 10 | 10 |
| MA-g-rubber 2 | 5 | — | — | — | — | — |
| Petr. C-9500 | — | — | — | — | 10 | 10 |
| Petr. C-3500 | — | 5 | 10 | 10 | — | — |
| Talc | 10 | 10 | 10 | 10 | 20 | 10 |
| Hydr. polybutadiene | — | — | — | 3 | 2 | — |
| Hydr. polybutene | — | — | — | — | — | 2 |
| ATPEO | 3 | 3 | 3 | — | 3 | 3 |
| Antioxidant | 0.2 | 0.2 | 0.2 | 0.2 | 0.2 | 0.2 |
| Paint Adhesion |  |  |  |  |  |  |
| % Failure | g/op | g/op | g/op | g/op | g/op | g/op |
| 1$^{st}$ pull | 98/48 | 3/0 | 0/0 | 0/0 | 1/0 | 0/3 |
| 3$^{rd}$ pull | —/100 | 26/0 | 0/6 | 9/0 | 1/0 | 24/16 |
| 5$^{th}$ pull |  | 54/3 | 6/14 | 16/6 | 1/0 | 42/42 |
| Durability |  |  |  |  |  |  |

TABLE 6

|  | Comp. 12 | Comp. 13 | Comp. 14 | Ex. 13 | Ex. 14 | Ex. 15 | Ex. 16 | Ex. 17 |
|---|---|---|---|---|---|---|---|---|
| TPO 1 | — | 100 | 100 | — | 100 | 100 | 100 | 100 |
| TPO 2 | 100 | — | — | 100 | — | — | — | — |
| MA-g-rubber 1 | 10 | — | — | 10 | 10 | — | 10 | 10 |
| MA-g-PP | 10 | — | — | 10 | — | — | — | — |
| MA-g-E/P | — | — | — | — | 10 | 10 | — | — |
| 10/3 Adduct | — | 13 | — | — | — | — | 13 | — |
| 10/4 Adduct | — | — | 14 | — | — | — | — | 14 |
| Petr. C-9500 | — | — | — | — | — | 10 | — | — |
| Petr. C-3500 | — | — | — | 5 | 5 | — | 5 | 5 |
| ATPEO | 3 | — | — | 3 | 3 | 3 | — | — |
| Antioxidant | 0.2 | 0.2 | 0.2 | 0.2 | 0.2 | 0.2 | 0.2 | 0.2 |
| Paint Adhesion |  |  |  |  |  |  |  |  |
| % Failure | g/op | g/op | g/op | g/op | g/op | g/op | g/op | g/op |
| 1$^{st}$ pull | 70/18 | 85/62 | 84/58 | 36/0 | 42/8 | 24/6 | 42/8 | 36/6 |
| 3$^{rd}$ pull | 100/32 | 100/82 | 100/74 | 54/9 | 48/36 | 48/24 | 54/36 | 42/12 |
| 5$^{th}$ pull |  | —/100 | —/100 | 78/24 | 82/42 | 82/48 | 82/42 | 56/36 |
| Durability |  |  |  |  |  |  |  |  |
| % Failure |  |  |  |  |  |  |  |  |
| 25 cycles | 70 | 100 | 100 | 0 | 10 | 16 | 32 | 35 |
| 100 cycles | 80 | 100 | 100 | 22 | 35 | 30 | 38 | 42 |

TABLE 7-continued

|  | Comp. 15 | Ex. 18 | Ex. 19 | Ex. 20 | Ex. 21 | Ex. 22 |
|---|---|---|---|---|---|---|
| % Failure |  |  |  |  |  |  |
| 25 cycles | 95 | 0 | 0 | 0 | 0 | 0 |
| 100 cycles | 95 | 0 | 0 | 0 | 0 | 0 |

Comparative Example 15 without a wax showed very poor paint adhesion and durability. Using a wax with the MA-g-PP, with or without a MA-g-rubber, gave good adhesion and durability (Examples 18–22). Examples 21 and 22 showed that a combination of an ATPEO and hydroxy-terminated polybutene or hydroxy-termninated polybutadiene can be used as the functionalized polymer component of the composition.

EXAMPLES 23–29 AND COMPARATIVE EXAMPLE 16

These examples and the comparative example show the effect of using an oxidized polyethylene wax in a thermoplastic olefin composition that contains MA-g-PP, an ATPEO or a hydroxy-terminated ethylene/ethylene oxide copolymer, with or without MA-g-rubber. Some of the compositions contain talc as a filler and all contain either conductive or non-conductive carbon black. The results are shown in Table 8.

In Table 8, the carbon black was the same as in Examples 10–12. Printex XE-2 conductive carbon black is commercially available from Degussa Corporation. Vulcan XC-72 and Vulcan PA-90 conductive carbon blacks are commercially available from Cabot Corporation. In Examples 27 and 29, Printex XE-2 conductive carbon black was added as a 23% dispersion in pelletized TPO 1 containing 0.2 pph B 225 antioxidant. The amount of carbon black in the dispersion is enclosed in parentheses. In Example 28, Vulcan XC-72 conductive carbon black was added as a 33% dispersion in pelletized TPO 1 containing 0.2 pph B 225 antioxidant. The amount of carbon black in the dispersion is enclosed in parentheses. (TPO 1) in Examples 27–29 indicates the amount of TPO 1 used as the matrix for the dispersions of conductive carbon blacks.

Hydroxy-terminated E/EO 1 was Unithox 480 hydroxy-terminated ethylene/ethylene oxide copolymer having a molecular weight $M_n$ of 2250 and a hydroxyl number of 22, and is commercially available from Petrolite Corporation. TPO 1, the MA-g-rubbers, and the MA-g-PP were described in Examples 1–4. The antioxidant and the ATPEO were the same as in the previous examples. The talc was the same as in Examples 18–22.

TABLE 8

|  | Comp. 16 | Ex. 23 | Ex. 24 | Ex. 25 | Ex. 26 | Ex. 27 | Ex. 28 | Ex. 29 |
|---|---|---|---|---|---|---|---|---|
| TPO 1 | 100 | 100 | 100 | 100 | 100 | 74 | 72 | 74 |
| (TPO 1) | — | — | — | — | — | (26) | (28) | (26) |
| MA-g-rubber 1 | 5 | 10 | 10 | 10 | 10 | 10 | 12 | 10 |
| MA-g-PP | 10 | 10 | 10 | 10 | 10 | 10 | 12 | 10 |
| MA-g-rubber 2 | 5 | — | — | — | — | — | — | — |
| Petr. C-3500 | — | 5 | 5 | 10 | 10 | 10 | — | 10 |
| Talc | — | 10 | 10 | — | — | — | — | 20 |

TABLE 8-continued

|  | Comp. 16 | Ex. 23 | Ex. 24 | Ex. 25 | Ex. 26 | Ex. 27 | Ex. 28 | Ex. 29 |
|---|---|---|---|---|---|---|---|---|
| Carbon black |  | 2 |  |  |  |  |  |  |
| Printex XE-2 | 2 | — | 2 | — | — | — | — | — |
| Vulcan XC-72 | — | — | — | 10 | — | — | — | — |
| Vulcan PA-90 | — | — | — | — | 10 | — | — | — |
| Dispersed XE-2 | — | — | — | — | — | (6) | — | (6) |
| Dispersed ATPEO | — | — | — | — | — | — | (14) | — |
| Hydrox. E/EO 1 | 3 | 3 | 3 | 3 | — | 3 | 3.6 | 3 |
| Antioxidant | — | — | — | — | 3 | — | — | — |
| Paint Adhesion | 0.2 | 0.2 | 0.2 | 0.2 | 0.2 | 0.2 | 0.24 | 0.2 |
| % Failure | g/op | g/op | g/op | g/op | g/op | g/op | g/op | g/op |
| $1^{st}$ pull | 100/48 | 0/0 | 0/0 | 0/0 | 18/0 | 8/6 | 18/0 | 0/0 |
| $3^{rd}$ pull | —/100 | 9/0 | 12/6 | 0/0 | 24/0 | 50/12 | 48/0 | 0/6 |
| $5^{th}$ pull |  | 20/6 | 23/32 | 6/2 | 42/4 | 74/30 | 76/18 | 15/18 |
| Durability % Failure |  |  |  |  |  |  |  |  |
| 25 cycles | 40 | 0 | 0 | 0 | 0 | 2 | 5 | 0 |
| 100 cycles | 50 | 0 | 30 | 0 | 10 | 20 | 40 | 0 |

Comparative Example 16 without the wax showed very poor paint adhesion and durability. Using the wax with the MA-g-PP, the functionalized polymer, and a filler, with or without the MA-grafted rubber, gave good adhesion and durability. Example 26 showed that a hydroxy-termninated ethylene/ethylene oxide copolymer can be used as the functionalized polymer without the use of an ATPEO.

EXAMPLES 30–37

Examples 30–34 show that good paint adhesion and durability can be obtained from compositions containing a TPO that includes two heterophasic polyolefins and an ethylene/octene copolymer rubber, as well as MA-g-PP, MA-g-rubber, an oxidized polyethylene wax, either an ATPEO or a hydroxy-terminated E/EO copolymer as the functionalized polymer, and, optionally, conductive carbon black as a filler. The results are shown in Table 9.

Good paint adhesion and durability are also obtained from compositions containing TPO 1, MA-g-PP, MA-g-rubber, an oxidized polyethylene wax, a hydroxy-terminated polyethylene or hydroxy-terminated E/EO copolymer as the functionalized polymer, and, optionally, talc as a filler (Examples 35–37). The results are given in Table 9.

In Examples 32–34, the Vulcan XC-72 conductive carbon black was added as a 33% dispersion in pelletized TPO 1 containing 0.2 pph B 225 antioxidant. The amount of carbon black in the dispersion is enclosed in parentheses. (TPO 1) in Examples 32–34 indicates the amount of TPO 1 used as the matrix for the dispersions of conductive carbon black.

Heterophasic polyolefins 1 and 2 were described in Examples 10–12. TPO 1, MA-g-PP, and MA-g-rubber 1 were described in Examples 1–4. The conductive carbon blacks were described in Examples 23–29. The antioxidant and the ATPEO were the same as in the previous examples. The talc was the same as in Examples 18–22.

Hydroxy-terminated E/EO 1 was described in Examples 23–29. Hydroxy-terminated E/EO 2 was Unithox 580 hydroxy-terminated ethylene/ethylene oxide copolymer having a molecular weight $M_n$ of 2400 and a hydroxyl number of 18, commercially available from Petrolite Corporation. The hydroxy-terminated polyethylene was Unilin 425 hydroxy-terminated polyethylene, commercially available from Petrolite Corporation.

TABLE 9

|  | Ex. 30 | Ex. 31 | Ex. 32 | Ex. 33 | Ex. 34 | Ex. 35 | Ex. 36 | Ex. 37 |
|---|---|---|---|---|---|---|---|---|
| TPO 1 | — | — | — | — | — | 100 | 100 | 100 |
| (TPO 1) | — | — | (23.3) | (23.3) | (23.3) | — | — | — |
| Het. polyolefin 1 | 50 | 50 | 38.3 | 38.3 | 38.3 | — | — | — |
| Het. polyolefin 2 | 30 | 30 | 23.3 | 23.3 | 23.3 | — | — | — |
| Engage 8150 | 20 | 20 | 15.1 | 15.1 | 15.1 | — | — | — |
| MA-g-PP | 15 | 15 | 11.5 | 17.25 | 17.25 | 10 | 10 | 10 |
| MA-g-rubber 1 | 15 | 15 | 11.5 | 17.25 | 17.25 | 5 | 10 | 5 |
| Petr. C-3500 | 10 | 10 | 11.5 | 11.5 | 11.5 | 10 | 10 | 10 |
| Vulcan XC-72 | — | 10 | — | — | — | — | — | — |
| Dispersed XC-72 | — | — | (10) | (10) | (10) | — | — | — |
| Hydrox. E/EO 1 | — | — | — | — | 4 | — | — | — |
| Hydrox. E/EO 2 | — | — | — | — | — | 3 | — | 3 |
| Hydrox. PE | — | — | — | — | — | — | 3 | — |
| Talc | — | — | — | — | — | — | — | 20 |
| ATPEO | 4 | 4 | 3 | 4 | — | — | — | — |
| Antioxidant | 0.2 | 0.2 | 0.2 | 0.2 | 0.2 | 0.2 | 0.2 | 0.2 |
| Paint Adhesion |  |  |  |  |  |  |  |  |
| % Failure | g/op | g/op | g/op | g/op | g/op | g/op | g/op | G/op |
| $1^{st}$ pull | 22/0 | 22/0 | 0/0 | 0/0 | 0/0 | 0/0 | 18/0 | 0/3 |
| $3^{rd}$ pull | 38/0 | 50/12 | 0/0 | 0/0 | 0/0 | 45/8 | 36/6 | 0/18 |
| $5^{th}$ pull | 64/12 | 74/28 | 0/0 | 0/0 | 0/0 | 78/40 | 42/18 | 10/38 |
| Durability |  |  |  |  |  |  |  |  |
| % Failure |  |  |  |  |  |  |  |  |
| 25 cycles | 0 | 0 | 0 | 0 | 0 | 0 | 0 | 0 |
| 100 cycles | 10 | 0 | 0 | 0 | 2 | 0 | 0 | 0 |

EXAMPLES 38–40 AND COMPARATIVE EXAMPLES 17–18

These examples and comparative examples show the effect of using an oxidized polyethylene wax in a thermoplastic olefin composition containing MA-g-PP and a functionalized polymer that reacts with the maleic anhydride groups of the grafted polymers, with and without MA-g-rubber. The results are given in Table 10.

In Table 10, TPO 3 was a blend of 40 parts of a crystalline propylene homopolymer having a melt flow rate of ~12 g/10 min and xylene solubles at room temperature of 4%, commercially available from Montell USA Inc.; 60 parts of an olefin polymer composition containing 68% by weight of an ethylene/1-butene copolymer, of which 82% was ethylene, having xylene solubles at room temperature of 35%, dispersed in 32% of a propylene homopolymer matrix having xylene solubles at room temperature of 2.3%; and 0.2 parts of Irganox B 225 antioxidant per hundred parts of polymer.

MA-g-rubber 1 and the MA-g-PP were described in Examples 1–4. Hydroxy-terminated E/EO 2 was described in Examples 30–37. The antioxidant and the ATPEO were the same as in the previous examples.

TABLE 10

|  | Comp. 17 | Comp. 18 | Ex. 38 | Ex. 39 | Ex. 40 |
|---|---|---|---|---|---|
| TPO 3 | 100 | 100 | 100 | 100 | 100 |
| MA-g-rubber 1 | — | — | 10 | 15 | 15 |
| MA-g-PP | 10 | 20 | 10 | 15 | 15 |
| Petr. C-3500 | — | — | 10 | 10 | 10 |
| ATPEO | 3 | 4 | 3 | 4 | — |
| Hydrox. E/EO 2 | — | — | — | — | 4 |

TABLE 10-continued

|  | Comp. 17 | Comp. 18 | Ex. 38 | Ex. 39 | Ex. 40 |
|---|---|---|---|---|---|
| Antioxidant | 0.2 | 0.2 | 0.2 | 0.2 | 0.2 |
| Paint Adhesion |  |  |  |  |  |
| % Failure | g/op | g/op | g/op | g/op | g/op |
| 1st pull | 72/12 | 85/0 | 32/6 | 12/0 | 18/0 |
| 3rd pull | 82/32 | 100/24 | 52/24 | 35/12 | 24/6 |
| 5th pull | 100/56 |  | 68/42 | 50/24 | 42/24 |
| Durability |  |  |  |  |  |
| % Failure |  |  |  |  |  |
| 25 cycles | 90 | 100 | 0 | 12 | 18 |
| 100 cycles | 95 | 100 | 24 | 32 | 36 |

Comparative examples 17 and 18 without a wax showed very poor paint adhesion and durability. Using a wax with the MA-g-PP and the MA-g-rubber gave good adhesion and durability. Example 40 shows that a hydroxy-terminated ethylene/ethylene oxide copolymer can be used as the functionalized polymer component of the composition without an ATPEO.

EXAMPLES 41–45 AND COMPARATIVE EXAMPLES 19–20

These examples and comparative examples show the effect of using an oxidized polyethylene wax in two different thermoplastic olefins containing a MA-g-PP, an ATPEO or a hydroxy-terminated ethylene/ethylene oxide copolymer as the functionalized polymer and, optionally, a MA-g-rubber. One of the compositions also contains talc as a filler. The results are shown in Table 11.

In Table 11, the TPO was either (1) a blend of a propylene homopolymer having a melt flow rate of ~5 dg/min and an isotactic index greater than 90, commercially available from Montell USA Inc., and Dutral 4038 ethylene/propylene/ethylidenenorbornene terpolymer rubber containing 4% ethylidenenorbornene, commercially available from Enichem America Inc., or (2) heterophasic polyolefin 3, which contained (a) 35% of a propylene homopolymer having an isotactic index, defined as the xylene insoluble fraction, of 97.5, (b) 6.9% of a semi-crystalline ethylene-propylene copolymer that was xylene insoluble at room temperature, and (c) 58.1% of an amorphous ethylene-propylene copolymer rubber that was xylene soluble at room temperature.

The MA-g-PP and MA-g-rubber 1 were described in Examples 1–4. Hydroxy-terminated E/EO 2 was described in Examples 30–37. The antioxidant and the ATPEO were the same as in the previous examples. The talc was the same as in Examples 18–22.

TABLE 11

|  | Comp. 19 | Comp. 20 | Ex. 41 | Ex. 42 | Ex. 43 | Ex. 44 | Ex. 45 |
|---|---|---|---|---|---|---|---|
| Polypropylene | 70 | — | 70 | — | — | — | 70 |
| Dutral 4038 | 30 | — | 30 | — | — | — | 30 |
| Het. polyolefin 3 | — | 100 | — | 100 | 100 | 100 | — |
| MA-g-rubber 1 | — | — | 10 | 10 | 10 | 10 | 10 |
| MA-g-PP | 10 | 10 | 10 | 10 | 10 | 10 | 10 |
| Petr. C-3500 | — | — | 10 | 5 | 10 | 10 | 10 |
| Talc | — | — | — | — | — | — | 10 |
| ATPEO | 3 | 3 | 3 | 3 | 3 | — | — |
| Hydrox. E/EO 2 | — | — | — | — | — | 3 | 3 |
| Antioxidant | 0.2 | 0.2 | 0.2 | 0.2 | 0.2 | 0.2 | 0.2 |
| Paint Adhesion |  |  |  |  |  |  |  |
| % Failure | g/op | g/op | g/op | g/op | g/op | g/op | g/op |
| 1$^{st}$ pull | 78/24 | 46/12 | 26/6 | 12/0 | 6/0 | 12/3 | 0/0 |
| 3$^{rd}$ pull | 100/32 | 68/28 | 38/6 | 22/6 | 18/0 | 16/6 | 12/0 |
| 5$^{th}$ pull | —/68 | 100/48 | 56/18 | 36/24 | 24/12 | 18/12 | 36/12 |
| Durability |  |  |  |  |  |  |  |
| % Failure |  |  |  |  |  |  |  |
| 25 cycles | 42 | 24 | 0 | 8 | 0 | 0 | 0 |
| 100 cycles | 76 | 68 | 15 | 24 | 8 | 6 | 0 |

Comparative Examples 19 and 20 without the wax showed very poor paint adhesion and durability. Using a wax with the MA-g-PP and the MA-g-rubber gave good adhesion and durability. Examples 44 and 45 showed that a hydroxy-terminated ethylene/ethylene oxide copolymer can be used as the functionalized polymer instead of an ATPEO.

EXAMPLES 46–51

These examples show the effect of using an oxidized polyethylene wax in a thermoplastic olefin composition containing MA-g-PP, maleic anhydride-grafted polyethylene, and a functionalized polymer that reacts with the maleic anhydride groups of the grafted polymers, with and without MA-g-rubber. The results are given in Table 12.

In Table 12, Ceramer 67 maleic anhydride-grafted polyethylene had a molecular weight $M_n$ of 655, a maleic anhydride content of 3.8%, and a melting point of 97° C., and is commercially available from Petrolite Corporation. Ceramer 1608 maleic anhydride-grafted polyethylene had a molecular weight $M_n$ of 700, a maleic anhydride content of 12.7% by weight, and a melting point of 121° C., and is commercially available from Petrolite Corporation.

TPO 1, MA-g-rubber 1, and MA-g-PP were described in Examples 1–4. Hydroxy-terminated E/EO 1 was described in Examples 23–29. TPO 1 was in pelletized form and contained 0.2 pph Irganox B-225 antioxidant. The antioxidant and the ATPEO were the same as in previous examples.

TABLE 12

|  | Ex. 46 | Ex. 47 | Ex. 48 | Ex. 49 | Ex. 50 | Ex. 51 |
|---|---|---|---|---|---|---|
| TPO 1 | 100 | 100 | 100 | 100 | 100 | 100 |
| MA-g-rubber 1 | 10 | 10 | — | — | 10 | — |
| MA-g-PP | 10 | 10 | 10 | 10 | 10 | 10 |
| Petr. C-3500 | 10 | 10 | 10 | 10 | 10 | 10 |
| Ceramer 67 | 10 | — | 10 | — | 10 | — |
| Ceramer 1608 | — | 10 | — | 10 | — | 10 |
| ATPEO | 3 | 3 | 3 | 3 | — | — |
| Hydr. E/EO 1 | — | — | — | — | 3 | 3 |
| Antioxidant | 0.2 | 0.2 | 0.2 | 0.2 | 0.2 | 0.2 |
| Paint Adhesion |  |  |  |  |  |  |
| % Failure | g/op | g/op | g/op | g/op | g/op | g/op |
| 1$^{st}$ pull | 0/0 | 0/0 | 0/0 | 0/0 | 0/0 | 0/0 |
| 3$^{rd}$ pull | 12/0 | 6/0 | 8/0 | 12/0 | 0/0 | 6/0 |
| 5$^{th}$ pull | 18/0 | 19/0 | 12/8 | 12/0 | 12/0 | 24/0 |
| Durability |  |  |  |  |  |  |
| % Failure |  |  |  |  |  |  |
| 25 cycles | 0 | 0 | 0 | 0 | 0 | 0 |
| 100 cycles | 0 | 0 | 4 | 8 | 0 | 0 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

I claim:

1. A composition comprising, by weight:
   (1) 100 parts of a thermoplastic olefin comprising an olefin polymer having an isotactic index of at least 80 and an olefin polymer rubber, the thermoplastic olefin having a rubber content of at least 20%;
   (2) about 5 to about 20 parts per hundred parts of the thermoplastic olefin of a propylene homopolymer or propylene copolymer with ethylene or a 4–8 C alpha-olefin having an ethylene or alpha-olefin content of about 0.5% to about 20%, grafted with an anhydride of an aliphatic α, β-unsaturated dicarboxylic acid and having an anhydride content of about 2% to about 5%;
   (3) about 3 to about 20 parts per hundred parts of the thermoplastic olefin of an oxidized polyethylene wax having a melting point of less than 116° C. and an acid number of less than 40;
   (4) a functionalized polymer that is reactive with the anhydride groups of the grafted polymers, selected from the group consisting of:
      (a) about 2 to about 6 parts per hundred parts of the thermoplastic olefin of an amine-terminated polyalkylene glycol;
      (b) about 2 to about 6 parts per hundred parts of the thermoplastic olefin of a hydroxy-terminated polyolefin,
      (c) about 2 to about 6 parts per hundred parts of the thermoplastic olefin of a hydroxy-terminated polybutadiene;
      (d) about 2 to about 8 parts per hundred parts of the thermoplastic olefin of a hydroxy-terminated olefin/alkylene oxide copolymer;
      (e) about 2 to about 8 parts per hundred parts of the thermoplastic olefin of a hydroxy-terminated polyalkylene oxide;
      (f) about 2 to about 8 parts per hundred parts of the thermoplastic olefin of a methoxy-terminated polyalkylene oxide, (g) about 2 to about 8 parts per hundred parts of the thermoplastic olefin of an amine-terminated olefin/alkylene oxide copolymer, and (h) mixtures thereof;

(5) optionally, about 5 to about 30 parts per hundred parts of the thermoplastic olefin of a polyolefin rubber grafted with an anhydride of an aliphatic α, β-unsaturated dicarboxylic acid, having an anhydride content of at least 0.3% but less than 3% and comprising a polymer of ethylene and a 3–8 C alpha-olefin, optionally containing about 0.5% to about 10% of a diene, which contains about 30% to about 70% ethylene; and (6) optionally about 5 to about 20 parts per hundred parts of the thermoplastic olefin of an ethylene polymer grafted with an anhydride of an aliphatic α, β-unsaturated dicarboxylic acid, having an anhydride content of about 1% to about 16% and a molecular weight $M_n$ of about 500 to about 5000, provided that at least 5 parts of anhydride-grafted polypropylene or propylene copolymer and 3 parts of oxidized polyethylene wax per hundred parts of the thermoplastic olefin are also present.

2. The composition of claim 1 wherein the thermoplastic olefin is a composition comprising, by weight:

(a) about 10% to about 60% of a propylene homopolymer having an isotactic index greater than 90, or a crystalline propylene copolymer with ethylene and/or a $C_{4-8}$ alpha-olefin having a propylene content greater than 85% and an isotactic index of greater than 85;

(b) about 30% to about 60% of an amorphous ethylene-propylene or ethylene-butene copolymer, optionally containing about 1% to about 10% of a diene, which is xylene soluble at room temperature and having an ethylene content of about 30% to about 70%;

(c) about 2% to about 20% of a semi-crystalline ethylene-propylene or ethylene-butene copolymer that is xylene insoluble at room temperature and having an ethylene content of greater than 75% but less than 92%; and (d) about 5% to about 20% of an ethylene polymer having a density of 0.91 to 0.96 g/cm³ and a melt index of 0.1 to 100 g/10 min.

3. The composition of claim 1 wherein the thermoplastic olefin is a composition comprising, by weight:

(a) about 20% to about 70% of a crystalline propylene homopolymer having an isotactic index greater than 90, or a crystalline propylene copolymer with ethylene and/or a $C_{4-8}$ alpha-olefin having a propylene content greater than 85% and an isotactic index of greater than 85;

(b) about 20% to about 75% of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and has an ethylene content of about 30% to about 70%; and (c) about 2% to about 30% of a semi-crystalline copolymer of ethylene selected from the group consisting of (i) ethylene/propylene, (ii) ethylene/butene-1, (iii) ethylene/octene-1, and (iv) mixtures thereof, which is xylene insoluble at room temperature and has an ethylene content of greater than 90%.

4. The composition of claim 1 wherein the thermoplastic olefin is a composition comprising, by weight:

(a) at least one heterophasic polyolefin composition comprising:
  (i) about 90% to about 55% of a propylene polymer material selected from the group consisting of a propylene homopolymer having an isotactic index greater than 90, and a crystalline copolymer of propylene and an alpha-olefin of the formula $CH_2=CHR$, where R is H or $C_2–C_6$ alkyl, the alpha-olefin being less than 10% of the copolymer, and
  (ii) about 10% to about 45% of an elastomeric copolymer of propylene and an alpha-olefin of the formula $CH_2=CHR$, where R is H or $C_2–C_6$ alkyl, the alpha-olefin being about 50% to about 70% of the elastomeric copolymer, and about 10% to about 40% of the elastomeric copolymer being insoluble in xylene at ambient temperature, and (b) about 5 to about 50 parts per hundred parts of (a) of an elastomeric copolymer of ethylene and a 3–8 C alpha-olefin made with a metallocene catalyst.

5. The composition of claim 1 wherein the thermoplastic olefin is a composition comprising, by weight:

(a) about 30% to about 50% of a propylene homopolymer having an isotactic index greater than 90, and (b) about 70% to about 50% of an olefin polymer composition comprising:
  (i) about 25% to about 50% of a crystalline propylene homopolymer with a solubility in xylene at room temperature of less than or equal to 4%, or a crystalline copolymer of propylene with ethylene or a 4–8 C alpha-olefin having an ethylene or alpha-olefin content of about 0.5% to about 3%, and a solubility in xylene at room temperature of less than or equal to 4%, and
  (ii) about 50% to about 75% of an amorphous copolymer of ethylene and a 4–8 C alpha-olefin, wherein the alpha-olefin content is about 10% to about 20%, and the copolymer is about 10% to about 40% soluble in xylene at room temperature.

6. The composition of claim 1 wherein the thermoplastic olefin is a composition comprising, by weight:

(a) about 80% to about 30% of a propylene homopolymer having an isotactic index greater than 90, and (b) about 20% to about 70% of an elastomeric copolymer of ethylene and a 3–8 C alpha-olefin, optionally containing about 1% to about 10% of a diene, and having an ethylene content of about 30% to about 70%.

7. The composition of claim 1 wherein the anhydride of the aliphatic α,β-unsaturated dicarboxylic acid is maleic anhydride.

8. The composition of claim 1 wherein the functionalized polymer is selected from the group consisting of (a) amine-terminated polyethylene oxide, (b) hydroxy-terminated polyethylene oxide, and (c) a hydroxy-terminated ethylene/ethylene oxide copolymer.

* * * * *

UNITED STATES PATENT AND TRADEMARK OFFICE
CERTIFICATE OF CORRECTION

PATENT NO. : 5,962,573
DATED : October 5, 1999
INVENTOR(S) : Dominic A. Berta

Page 1 of 1

It is certified that error appears in the above-identified patent and that said Letters Patent is hereby corrected as shown below:

Column 14,
Line 13, in Table 8, after "Dispersed" insert --XC-72--

Signed and Sealed this

Seventh Day of August, 2001

Attest:

Attesting Officer

NICHOLAS P. GODICI
*Acting Director of the United States Patent and Trademark Office*